(12) United States Patent
Dearman et al.

(10) Patent No.: US 12,240,189 B2
(45) Date of Patent: Mar. 4, 2025

(54) METHODS AND SYSTEMS FOR MANUFACTURING COMPOSITE COMPONENTS

(71) Applicant: Bell Helicopter Textron Inc., Fort Worth, TX (US)

(72) Inventors: Michael Dean Dearman, Weatherford, TX (US); Jared Mark Paulson, Fort Worth, TX (US); Paul K. Oldroyd, Azle, TX (US); Paul Sherrill, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 927 days.

(21) Appl. No.: 15/937,009

(22) Filed: Mar. 27, 2018

(65) Prior Publication Data

US 2019/0299543 A1   Oct. 3, 2019

(51) Int. Cl.
| | | |
|---|---|---|
| *B29C 64/00* | (2017.01) | |
| *B29C 33/38* | (2006.01) | |
| *B29C 33/44* | (2006.01) | |
| *B29C 35/02* | (2006.01) | |
| *B29C 53/82* | (2006.01) | |
| *B29C 70/44* | (2006.01) | |
| *B29C 70/48* | (2006.01) | |
| *B29L 31/30* | (2006.01) | |

(52) U.S. Cl.
CPC .......... *B29C 70/44* (2013.01); *B29C 33/3857* (2013.01); *B29C 33/44* (2013.01); *B29C 35/0227* (2013.01); *B29C 53/824* (2013.01); *B29C 70/48* (2013.01); *B29L 2031/3076* (2013.01)

(58) Field of Classification Search
CPC .......................... B29C 70/44; B29C 33/3857
See application file for complete search history.

(56) References Cited

U.S. PATENT DOCUMENTS

| | | | |
|---|---|---|---|
| 4,681,724 A | | 7/1987 | Faiz et al. |
| 4,822,272 A | * | 4/1989 | Yanase .................... B29C 33/38 |
| | | | 425/436 R |

(Continued)

FOREIGN PATENT DOCUMENTS

| | | |
|---|---|---|
| WO | 2006 099671 A1 | 9/2006 |
| WO | 2009 020466 A1 | 2/2009 |

OTHER PUBLICATIONS

Communication pursuant to Article 94(3) EPC; Appln No. 18 171 980.8-1017; Ref No. JL94654P.EPP; 8 pages, Feb. 18, 2020.

(Continued)

*Primary Examiner* — Nicholas R Krasnow
(74) *Attorney, Agent, or Firm* — Baker Botts L.L.P.

(57) ABSTRACT

A method for forming composite components includes disposing composite laminate over a mandrel. The method further includes infusing the composite laminate with a resin. A gelation of the infused resin is caused by applying a first environmental condition to the composite laminate and mandrel. At least a portion of the mandrel is deformed by applying a second environmental condition to the composite laminate and mandrel. The method further includes forming a composite structure by curing the composite laminate infused with resin. The deformed mandrel is removed from the composite structure after forming the composite structure.

12 Claims, 6 Drawing Sheets

(56) References Cited

U.S. PATENT DOCUMENTS

| | | | |
|---|---|---|---|
| 5,259,901 A | 11/1993 | Davis et al. | |
| 6,692,681 B1 | 2/2004 | Lunde | |
| 7,422,714 B1 | 9/2008 | Hood et al. | |
| 7,622,069 B1* | 11/2009 | Kia | B29C 33/485 264/230 |
| 2004/0082394 A1* | 4/2004 | Lee | F16C 3/026 464/182 |
| 2005/0056362 A1* | 3/2005 | Benson | B29C 70/388 156/163 |
| 2010/0123270 A1* | 5/2010 | Owens | B29C 45/4421 264/318 |
| 2010/0186893 A1 | 7/2010 | Ashton et al. | |
| 2010/0230850 A1* | 9/2010 | Sanderson | B29C 33/505 264/164 |
| 2011/0076461 A1* | 3/2011 | Jacob | B29C 70/34 428/178 |
| 2011/0272536 A1* | 11/2011 | Valembois | B29C 33/485 248/200 |
| 2012/0118487 A1* | 5/2012 | Havens | B29C 33/3857 156/165 |
| 2012/0119412 A1* | 5/2012 | Havens | B29C 70/446 264/230 |
| 2012/0119416 A1* | 5/2012 | Huelskamp | B29C 33/485 264/313 |
| 2015/0013819 A1* | 1/2015 | Stewart | B29C 53/822 138/109 |
| 2016/0001472 A1* | 1/2016 | Downs | B29C 70/205 156/196 |
| 2016/0016355 A1* | 1/2016 | Marcoe | H05K 1/056 174/255 |
| 2016/0052226 A1* | 2/2016 | Oehler | B32B 37/0076 428/167 |
| 2017/0174313 A1* | 6/2017 | Brakes | B64C 3/28 |
| 2017/0297231 A1* | 10/2017 | Gunther | B29C 70/30 |
| 2018/0319051 A1* | 11/2018 | Heath | B29C 43/02 |
| 2019/0091948 A1* | 3/2019 | Strutt | B64D 29/00 |

OTHER PUBLICATIONS

Supplementary European Search Report for Application No./Patent No. 18171980.8-1019—Dec. 14, 2018.

EPO Communication Pursuant to Article 94(3) EPC for Application No. 18 171 980.8-1019—Jan. 11, 2019.

* cited by examiner

METHODS AND SYSTEMS FOR MANUFACTURING COMPOSITE COMPONENTS

TECHNICAL FIELD

This disclosure relates generally to manufacturing composite components, and more specifically, to using a deformable mandrel to manufacture composite components.

BACKGROUND

Increasingly, components for all types of machines, vehicles, and products are constructed using composite materials. A composite material is a material made using one or more constituent materials with different physical or chemical properties that, when combined, produce a material having characteristics different from those of its individual components. For example, sheets of carbon fiber may be combined using a resin to produce carbon fiber components that may have reduced weight compared to all-metal components without compromising the strength of the component.

Composite components may be produced using a variety of methods. For example, composite laminate may be formed around a mandrel that has the desired shape for the finished composite component. In some cases, the composite laminate is pre-infused with a resin and then exposed to a certain temperature and/or pressure while disposed over the mandrel to form a composite component. In other cases, a composite laminate may be infused during the formation process.

The complexity of the formation process may increase with the complexity of the shape and/or the size of the desired composite component. For example, a composite component with a complex shape, such as a twisted surface, may require additional considerations. In some cases, a mandrel having multiple pieces may be used to create the complex shape. The multi-piece mandrel may be dissembled after the composite laminate is formed to allow for the extraction of the mandrel in other cases, additional bulk, e.g., unnecessary composite laminate or other layers, may be added to help form the complex shape. This reduces, however, the fiber volume fraction and may require additional processing after the component's formation.

SUMMARY OF THE DISCLOSURE

According to one embodiment, method for forming composite components includes disposing composite laminate over a mandrel. The method further includes infusing the composite laminate with a resin. Gelation of the infused resin is caused by applying a first environmental condition to the composite laminate and mandrel. At least a portion of the mandrel is deformed by applying a second environmental condition to the composite laminate and mandrel. The method further includes forming a composite structure by curing the composite laminate infused with resin. The deformed mandrel is removed from the composite structure after forming the composite structure.

In particular embodiments, the mandrel is not removable from the composite structure before the portion of the mandrel is deformed.

In particular embodiments, the mandrel includes a first portion and second portion. The first portion does not deform when the second environmental condition is applied. The second portion deforms when the second environmental condition is applied. The second portion also does not deform when the first environmental condition is applied.

In particular embodiments, the method further includes covering the mandrel with a vacuum bag prior to disposing the composite laminate over the mandrel.

In particular embodiments, the method further includes disposing cure tooling over at least a portion of the composite laminate and mandrel prior to applying the first environmental condition.

In particular embodiments, the second environmental condition is a temperature between a gelation temperature of the resin and a curing temperature of the composite structure In particular embodiments, the second environmental condition is an increased pressure above a pressure applied during gelation of the infused resin.

In particular embodiments, the infusing the composite laminate with a resin is part of a Resin Transfer Molding (RTM) process, a Resin infusion RI process, a resin film infusion (RFI), or a Vacuum Assisted Resin Transfer Molding (VARTM) process.

In particular embodiments, the composite structure includes a shape of a surface of a solid of revolution.

In particular embodiments, disposing the composite laminate over a mandrel includes applying a tackifier to the mandrel and/or the composite laminate.

In particular embodiments, disposing the composite laminate over a mandrel does not include applying a tackifier to the mandrel and/or the composite laminate.

In particular embodiments, applying a second environmental condition to the composite laminate and mandrel initiates a catalyzation event that causes the deformation of the portion of the mandrel.

According to another embodiment, a mandrel includes a surface and a deformable portion. The surface has a shape matching the shape of a surface of a composite structure. The deformable portion is configured to deform when an environmental condition is applied to the mandrel after an infusion of resin into composite laminate disposed over the mandrel and the gelation of the infused resin. The deformable portion is further configured to remain undeformed when environmental conditions causing the gelation of the infused resin are applied to the mandrel.

In particular embodiments, the mandrel is not removable from the composite structure formed on the mandrel before the deformable portion of the mandrel is deformed.

In particular embodiments, the mandrel further includes a vacuum bag disposed over the surface of the mandrel.

In particular embodiments, wherein the environmental condition is a temperature between a gelation temperature of the resin and a curing temperature of a composite structure formed from the composite laminate.

In particular embodiments, the environmental condition is an increased pressure above a pressure applied during gelation of the infused resin.

In particular embodiments, the surface of the mandrel includes a shape of a surface of a solid of revolution.

In particular embodiments, the environmental condition catalyzes a portion of the deformable portion of the mandrel that causes the deformation of the deformable portion of the mandrel.

Certain embodiments may provide one or more technical advantages. For example, certain embodiments provide a deformable mandrel, which may deform during the formation of a composite component over the mandrel. The mandrel may maintain its original shape after gelatization of a resin within the overlying composite layers, thereby ensuring that the composite layers are sufficiently rigid prior to deformation of a part of the mandrel. Because a portion of the mandrel is deformable, the mandrel may have a complex shape matching the desired shape of the composite component, thereby reducing the risk of wrinkles from expansion to the outside mold line cure mold without incorporating laminate stacking arrangements that may induce internal shear strains and microcracking. As another example, in certain embodiments the mandrel is composed of a single structure matching the shape of a desired composite component. This may increase the fiber volume fractions and allow complex composite structures to be formed without multi-piece mandrels necessary to extract the mandrel. As yet another example, certain embodiments include a vacuum bag between the mandrel and the overlying composite laminate. In this manner, the vacuum bag may be used to secure the mandrel after deformation and aid in its extraction from the cured composite structure.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 6 of the drawings, like numerals being used for like and corresponding parts of the various drawings.

Composite structures formed from composite materials are an integral part of many modem systems and machines. Using composite materials, instead of traditional materials such as metals or plastics, may provide the composite structure with new, improved, or certain desired physical properties. Accordingly, composite structures replaced traditionally metal components on certain machines. For example, composite structures have been used to replace previously metal parts of aircrafts, such as fairings, spoilers, fuselages, wing structures, and rotor blades. In the case of a helicopter, the rotor blades or spindle may be formed from one or more composite laminate layers laid up on a mandrel and then processed, e.g., cured, with resin or epoxy with an application of pressure, temperature, and/or other environmental conditions.

Complex composite structures typically require complex tooling and mandrels to manufacture them. For example, composite laminate may be laid up onto a mandrel having a near-net inner mold line (IML), which is then encased inside tooling that have a net outside mold line (OML). These components may provide the surface which imparts the desired shape of an inner and outer surface of the composite structure, respectively. Although complex composite structures can be formed using conventional tooling, conventional processes often require the removal or disengagement of the tooling and/or mandrels around the composite part prior to removing the composite component from the tooling. For example, a complex composite structure with a curved surface may require that a section of the mandrel be removed before the composite component due to its geometry. As a result, complex components are more expensive to produce and may require tooling and/or a mandrel that is more complex. One approach to addressing this issue is to provide a mandrel composed of several pieces that may be assembled together to form the desired mandrel shape. The multi-piece mandrel may be disassembled after forming the composite component, which may allow the removal of the mandrel from the composite component. Using a multi-piece mandrel requires additional processing time to assemble and disassemble the mandrel before and after forming the composite structure and requires intricate mandrel pieces that can be disassembled with the composite structure disposed over the mandrel. Alternatively or additionally, additional bulk, e.g., unnecessary composite laminate or other layers, may be added to help form the complex shape. This reduces, however, the fiber volume fraction and may require additional processing after the component's formation.

The teachings of the disclosure recognize that it is desirable to form complex composite structures without complex mandrels or tooling and without unnecessary bulk layers. According to the teachings of the disclosure, described herein are embodiments of methods and systems for simplifying the manufacture of complex composite structures by providing a mandrel that remains within the composite component until cured, but is still removable from the tooling and composite component. For example, certain embodiments provide a deformable mandrel, which may deform during the process of forming a composite component over the mandrel. The mandrel may have a complex shape matching the desired shape of the composite component, but may deform after the composite structure is sufficiently rigid to retain its shape. The deformation of the mandrel may occur in response to a predetermined environmental condition during the formation process. For example, the mandrel may be designed to deform in response to an applied temperature above a threshold, but retain its shape at lower temperatures. In this manner, certain embodiments may provide a mandrel that can include a near-net or net mold shape, obviating the need to add bulk and increasing the fiber volume fractions, and also be extractable without requiring disassembly, even for complex composite structures.

Figure 1:
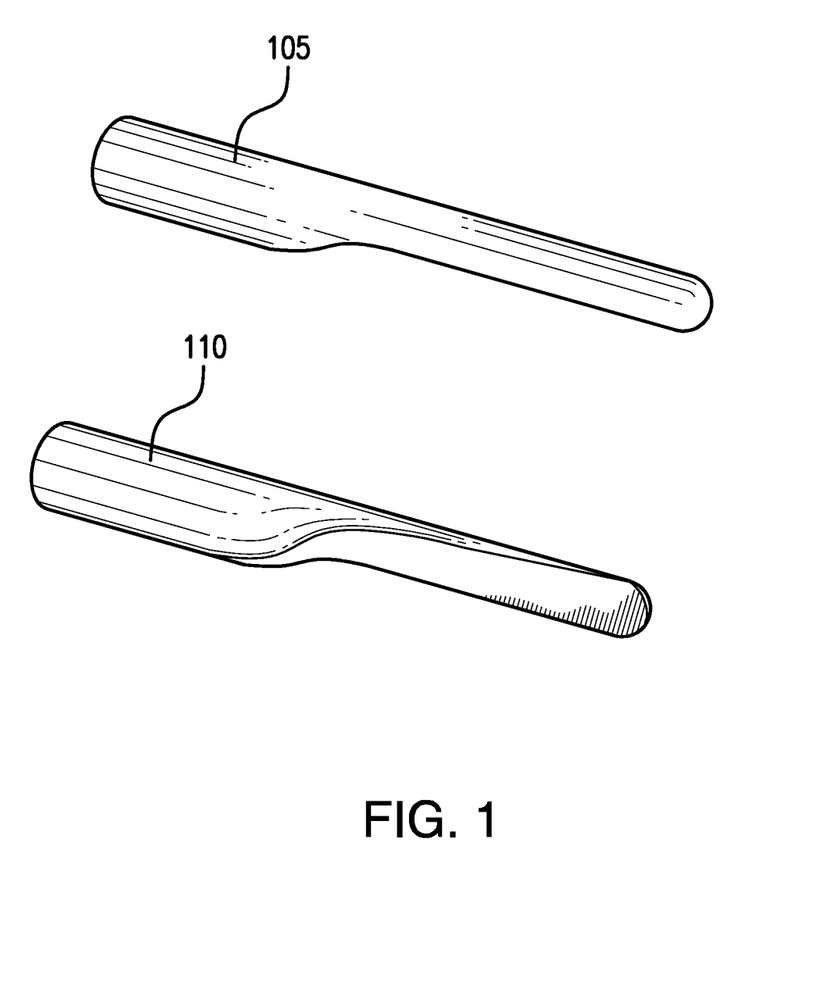
FIG. 1 illustrates example composite components, according to certain embodiments.

FIG. 1 illustrates example composite components, according to certain embodiments. FIG. 1 illustrates two example rotors 105, 110 having different geometries. Each of rotors 105, 110 may include one or more composite laminate layers formed together using a resin and shaped around tooling to provide the desired form of rotors 105, 110. Rotor 105 has a simpler geometry than Rotor 110. For example, the blade portion of rotor 105 is flat, meaning that the cross section of rotor 105 may have the same shape and orientation from one end to the other. Due to its simple geometry, rotor 105 may be manufactured using tooling and a mandrel having equally simple geometry. As a result, rotor 105 may not require a complex laying up processes of the composite laminate to form its shape. Further, the mandrel used for forming rotor 105 may be extracted without disassembling the tooling or the mandrel due to its simple geometry.

In contrast, rotor 110 has a complex geometry arising from its curved rotor blade portion. Unlike rotor 105, the cross section of rotor 110 may change its orientation from end to end. For example, the cross section of the blade of rotor 110 may appear to rotate along the length of rotor 110, matching the twisted surface of rotor 110. Accordingly, it is more difficult to provide sufficient molding to produce the shape of rotor 110. For example, tooling providing the net OML and a mandrel providing the net IML must also have similarly complex surfaces to avoid using bulk layers. In this case, the complex shape of the mandrel may prevent its extraction from the composite structure because one or more portions of the surface of the composite structure may interfere with an adjacent portion of the mandrel and block its removal. As discussed herein, if the mandrel can change its shape and/or reduce its size, it may be extractable from the composite structure.

As discussed herein, various ways exist to form a composite structure and the process used may be based on the desired size, shape, and/or construction of the resulting structure. For example, factors such as the shape, the size, the length, the width, composite materials, resin type, etc. may be considered when choosing which process to use. Although rotors, such as rotors 105 and 110 may be used as example composite structures throughout this disclosure, the methods and systems described herein are also applicable to any composite structure. It is also contemplated that the methods and systems described herein may be compatible with any non-infusion or infusion processes that are known to persons having ordinary skill in the art.

Figures 2A, 2B:
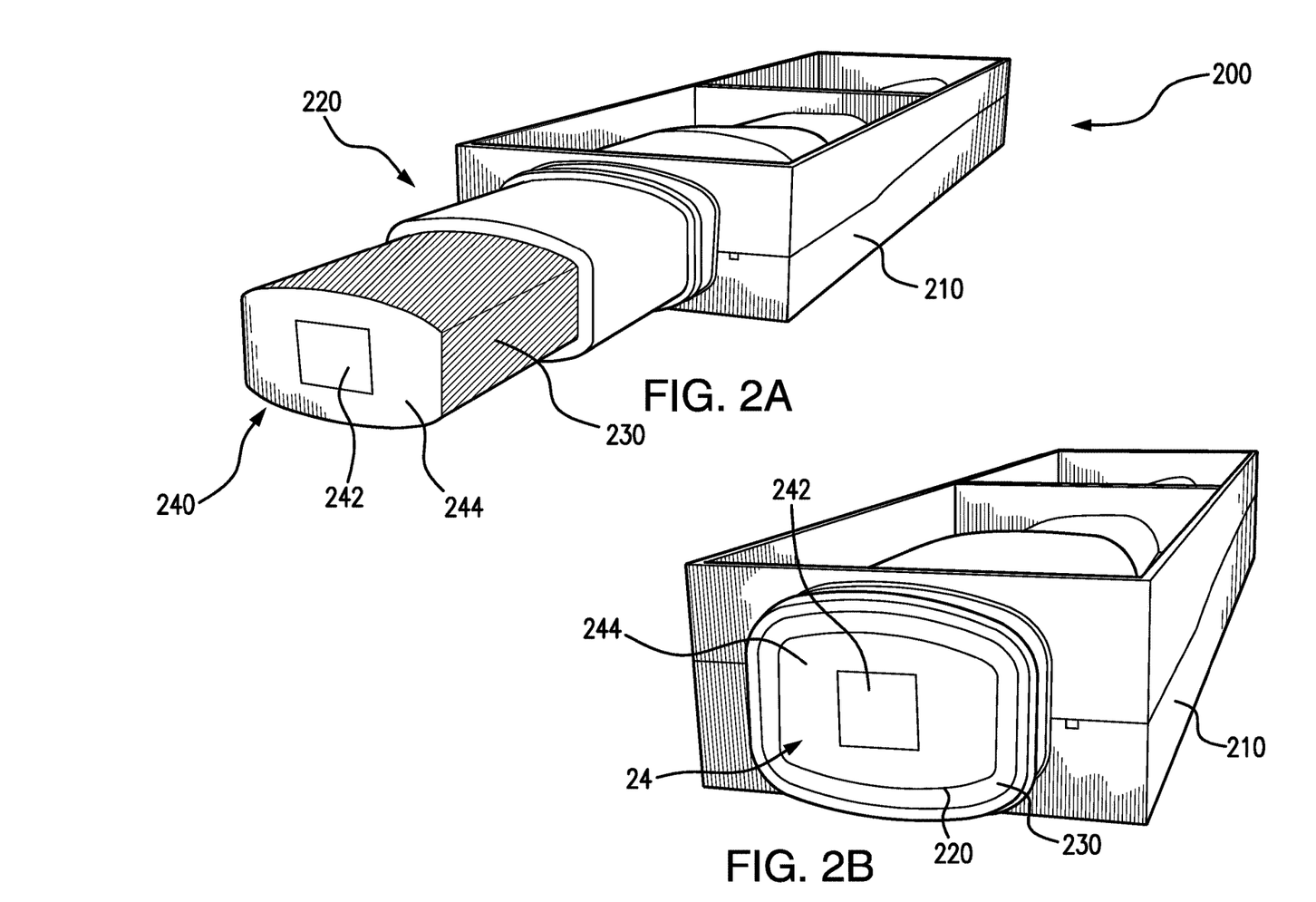
FIGS. 2A and 2B illustrate example composite manufacturing system in exploded and non-exploded isometric views, according to certain embodiments.

FIGS. 2A and 2B illustrate example composite manufacturing system 200 in exploded and non-exploded isometric views, according to certain embodiments. Composite manufacturing system 200 may include cure tooling 210, composite laminate 220, vacuum bag 230, and mandrel 240. Composite manufacturing system 200 may be used to manufacture composite structures using the surfaces of its various components to form the shape of the composite structures. For example, composite manufacturing system 200 may be configured to manufacture airframe components for tiltrotor aircraft, such as a spindle, or other aircraft components, such as rotors. The components of composite manufacturing system 200 may be sized and shaped based on the desired size and shape of the manufactured composite structures.

Cure tooling 210 may include one or more outside mold line components. For example, cure tooling 210 may include two components that are separable, allowing cure tooling 210 to encase and be removed from other components of composite manufacturing system 200. Cure tooling 210 may have a surface that matches the surface of the desired composite structure. For example, cure tooling 210 may have one or more surfaces that together form a net OML surface of a composite structure. As shown in the example in FIG. 2A, cure tooling 210 may include two halves with each half comprising half of the net OML surface of a composite structure. In this manner, cure tooling 210 may have a net outside mold line for a desired composite structure. In certain embodiments, composite manufacturing system 200 may not include cure tooling 210. For example, composite manufacturing system 200 may only form an interior surface of the composite structure, e.g., using the surface of mandrel 240 to provide the mold surface. In such cases, cure tooling 210 may not be needed and composite manufacturing system 200 may be configured to form a composite structure without cure tooling 210.

In certain embodiments, mandrel 240 may provide the net or near-net IML surface for the desired composite component. For example, mandrel 240 may have a corresponding surface that matches an interior surface of the desired composite structure. For example, as shown in the exploded view, composite laminate 220 may be laid up or around mandrel 240. Because composite laminate 220 is pliable prior to curing, laying up composite laminate 220 onto mandrel 240 causes composite laminate 220 to conform to the surface of mandrel 240.

Composite laminate 220 may include any composite laminate as known in the art. For example, Composite laminate 220 may include one or more layers of high-modulus, high-strength fibers in a polymeric, metallic, or ceramic matrix material. In particular, composite laminate 220 may include one or more layers of one or more composite materials such as cellulose, graphite, glass, boron, and silicon carbide. Composite laminate 220 may be infused with a resin or any other matrix materials, such as epoxies, polyimides, aluminum, titanium, and alumina. Composite laminate 220 may be infused with resin before or after being laid up onto mandrel 240. For example, in some embodiments composite laminate 220 includes one or more pre-pregnated laminate layers. In some embodiments, composite laminate 220 includes "dry" laminate layers without any infused resin. For example, composite manufacturing system 200 may include a resin infusion system (not pictured) that aids in the infusion of resin into composite laminate 220 once disposed over mandrel 240.

In certain embodiments, composite laminate 220 may further include resin distribution media. The resin distribution media may be any suitable distribution media that is configured to distribute resin across the surface of laminate layers in composite laminate 220. The resin distribution media may, in some embodiments, become part of the resulting composite structure. In some embodiments, the resin distribution media is not integrated into the resulting composite structure. In this manner, composite manufacturing system 200 may be adapted for both pre-pregnated and infusion processes In certain embodiments, mandrel 240 is an integrated mandrel, such that mandrel 240 is not configured to be disassembled into constituent parts. As a result, mandrel 240 may be constructed more simply and provide a closer to net IML shape. In some embodiments, mandrel 240 includes two portions, such as non-deformable portion 242 and deformable portion 244 illustrated in FIG. 2A. Non-deformable portion 242 and deformable portion 244 may include different materials or comprise different physical structures. For example, non-deformable portion 242 may be composed of material(s) having different physical properties than the material(s) of deformable portion 244. As a result, deformable portion 244 and non-deformable portion 242 may respond differently when exposed to the same environmental conditions. Some or all of deformable portion 244 may deformed when exposed to certain environmental conditions or ranges thereof. For example, deformable portion 244 may deform when exposed to a temperature exceeding a certain threshold or to a pressure above a certain threshold, but may maintain its shape when exposed to temperatures and/or pressures below those thresholds. Because the environmental conditions inside and outside composite manufacturing system 200 may be controlled, the deforming environmental condition may be applied after composite laminate 220 is sufficiently rigid, such as after the gelation of resin within composite laminate 220. In this manner, the shape of mandrel 240 may be changed by deforming deformable portion 244. Accordingly, mandrel 240 with a changed shape may be extracted after the composite structure is formed, even if it was not extractable prior to its deformation.

In certain embodiments, the entirety of mandrel 240 is deformable. For example, mandrel 240 may be formed from a single material that is deformable when a certain environmental condition is applied during the curing process of the composite structure. In some embodiments, mandrel 240 is exposed to the deforming environmental condition for a certain period of time. In this manner, the exposure time may be controlled such that only a desired amount of deformation may occur. Thus, even if the entirety of mandrel 240 is deformable, only a portion thereof would deform when exposed to the deforming environmental condition. In some embodiments, the entirety of mandrel 240 or substantial portion thereof is deformed during the deformation process. For example, mandrel 240 may completely dissolve, melt, or otherwise deform during the formation of the composite structure.

In certain embodiments, non-deformable portion 242 is a rigid member extending along the length of mandrel 240. Because non-deformable portion 242 may retain its shape during the curing process, it may aid in extracting extract mandrel 240 after curing the composite structure. For example, non-deformable portion 242 may be handled easily because it retains its shape and rigidity during the formation of the composite component. An operator may extract all of mandrel 240 via this rigid portion, thereby aiding in its extraction.

In certain embodiments, mandrel 240 retains its shape until the cure process reaches the "gel point," e.g., until gelation of the resin within composite laminate 220. At this point, the resin may become so viscous such that it no longer flows in composite laminate 220. For example, a temperature exposed to composite manufacturing system 200 may increase above a gelation temperature of the resin. In some embodiments, mandrel 240 may deform when exposed to these increased temperatures or to certain temperatures above the gelation temperature. In some embodiments, mandrel 240 may deform when exposed to temperatures between the gelation temperature and the curing temperature, which is a temperature at which the resin within composite laminate 220 may continue to harden and cross-link constituent polymers. By deforming only in certain environmental conditions during the curing of the composite component, mandrel 240 may retain its shape during the portions of the process requiring the support of mandrel 240, but also allow its extraction after the curing process is over.

In certain embodiments, the application of an environmental condition to composite laminate 220 and mandrel 240 initiates a catalyzation event that causes the deformation of mandrel 240. For example, deformable portion 244, or portions thereof, may include elements which are only catalyzed only in certain environmental conditions. As a more specific example, deformable portion 244 may include embedded deposits of certain elements that, when certain environmental conditions are applied, may catalyze with the surrounding material of deformable portion 244, causing deformable portion 244 to deform. As another example, embedded deposits of catalyzing elements may be encased in a structure such as a bead or sphere, which breaks when exposed to a certain temperature and/or pressure. Once broken, the catalyzation and deformation may occur as described above. Thus, mandrel 240 may be provided with an internal deforming process that can be controlled by controlling the applied environmental conditions. These embodiments may be used in addition to or alternatively to those discussed above to provide a deformable mandrel 240.

As shown in FIG. 2A and 2B, certain embodiments of composite manufacturing system 200 may include a vacuum bag or bladder 230. Vacuum bag 230 may transfer pressure using a vacuum from the inside mold line of the composite structure (or components thereof, including composite laminate 220 and the resin). In certain embodiments, mandrel 240 may be covered with vacuum bag 230. Vacuum bag 230 may cover mandrel 240 prior to disposing the composite laminate over mandrel 240. Vacuum bag 230 may evacuate volatiles such as air and other gasses and may provide compaction pressure to aid consolidation of the laminate. In embodiments where resin is infused after composite laminate 220 is laid up on mandrel 240, vacuum bag 230 may provide a path for the resin flow either by applying a pressure to the resin to push resin into the laminate, such as in the Vacuum Assisted Resin Transfer Molding (VARTM) and Resin Film Infusion (RFI), or by providing an evacuation path for the volatiles that enables the resin front to follow.

In certain embodiments, an internal backbone for mandrel 240 may be used. The internal backbone may selectively couple mandrel 240 and cure tooling 210. For example, non-deformable portion 242 may include an internal backbone that can be coupled to a portion of cure tooling 210. During the curing process, composite laminate 220 and components within cure tooling 210 may change shape and/or size in response to being exposed to heightened temperatures and/or pressures. The coupling of mandrel 240 and cure tooling 210 may maintain the relative spacing between these components during the formation of the composite structure. As a result, the composite structure is formed with its desired shape and size without applying forces that may cause shearing, microcracking, and wrinkling that may compromise the composite structure.

In certain embodiments, the composite structure formed from composite laminate 220 may have a shape of a surface of a solid of revolution or a tubular shape with a central axis but is not rotationally symmetric. For example, the composite structure may have a cylindrical shape that is a generated by rotating a surface around an axis. Rotors 105 and 110 of FIG. 1 may represent tubular surfaces. For example, the surface of rotor 105 may be generated by rotating a straight line and the surface of rotor 110 may be generated by rotating a curved line, resulting in its curved surface. In some embodiments, the shape of the surface of the composite structure may have a tubular surface but defined with some portion removed. For example, a portion of the tubular surface may be removed, such as a C channel with flanges.

In certain embodiments, using composite manufacturing system 200 may also include using a tackifier. Tackifier may be applied to mandrel 240 and/or composite laminate 220. The tackifier may enhance the adhesion between mandrel 240 and laminate 220. This may prevent undesired wrinkles and/or deformations in composite structure during the process of laying up composite laminate 220 and curing. In certain embodiments, no tackifier is applied. For example, in certain embodiments no tackifier is used with composite manufacturing system 200 when disposing composite laminate 220 over mandrel 240.

FIG. 2B illustrates composite manufacturing system 200 shown in its non-expanded form. For example, each of mandrel 240, vacuum bag 230, laminate and distribution media 220 are encased in cure tooling 210. In certain embodiments, cure tooling 210 is an open-ended tooling apparatus, such that one end is open, as illustrated in FIGS. 2A and 2B. In some embodiments, composite manufacturing system 200 further includes a sealing component on the end of cure tooling 210 to cap the open-ended side. In certain embodiments, cure tooling 210 is a closed tooling apparatus, obviating the need to seal an open portion thereof. The use of an open-ended or closed cure tooling 210 may depend on the size and/or shape of the composite structure to be formed.

The methods and systems described herein may apply equally to any type of cure tooling or mandrel, such as tooling or mandrels used in a Resin Infusions (RI) process, a Resin Transfer Molding (RTM) process, a Resin Film Infusion (RFI) process, or a Vacuum Assisted Resin Transfer Molding (VARTM) process, as described below.

Although composite manufacturing system 200 is used as an example system for forming a composite structure, any system or method used to form a composite structure using a mandrel is contemplated herein. There are two main categories of processes for forming composite structures. The first category includes using pre-pregnated (also referred to as "prepreg") composite laminate. In this category, the process includes infusing the composite laminate with a resin or other epoxy prior to laying up the composite laminate on a mandrel. This has the benefit of avoiding the need to infuse the composite laminate with resin during the formation process. Instead, the prepreg composite laminate is processed using an application of heat and/or pressure to form the composite component. Prepreg laminate may be more expensive and may require storage in environmentally controlled spaces due to its temperature sensitivity. Additionally, even small errors in laying up the prepreg laminate may result in undesired voids, wrinkles, and fiber misalignment during the curing process, resulting in compromised composite structures or additional post-curing processing.

The other main category includes processes that use "dry" laminate that is first laid up onto the mandrel and then infused with resin during the process of forming the composite structure. These "dry" laminate sheets are easier to store and come at a reduced cost. There are various types of infusion processes that are used to infuse the resin into the composite laminate during the manufacture of the composite structure. One such process is simply referred to resin infusion (RI). This refers to the broad category of infusion processes where resin is injected or distributed in the composite laminate layers during or prior to curing. This may be done so through one or more distribution media. For example, there may be a layer around the composite laminate layers that is injected with resin and distributes it across the distribution media and into the composite laminate layers.

Another infusion process is called Resin transfer molding (RTM). RTM may include two or more parts of a mold that come together to create the net mold or surface of the desired composite structure. Reinforcements such as a preform may be placed within the mold during the laying up process to ensure that the composite material maintains its shape during curing and infusion. Resin may be dispensed into the mold under low to moderate pressure through injection ports. The resin may follow a predesigned path through the preform, which may serve as a distribution media. The mold and resin can be heated and cured. Once cured the molding may be removed around the composite structure that is formed from the composite laminate layers and resin. The resulting composite structure may be further processed after its removal from the mold. For example, additional temperature and pressure conditions may be applied to the composite structure or additional layers may be added to further strengthen or add components to portions of the composite structure.

The RTM process benefits from using the less expensive "dry" material, which may be stored at room temperature. The RTM process can produce thick near-net shaped parts and eliminate much of the post fabrication work. This process may also allow for a complexly shaped molding tools, allowing for a wider variety of parts to be manufactured.

Another infusion technique is reaction injection molding (RIM). The RIM process injects a rapid cure resin and a catalyst into the mold in two separate streams. These streams may be mixed in during the injection and the resultant chemical reaction occurs in the mold instead of a dispensing head or prior to injection into the distribution media. This process may be quicker and require less sophisticated components of distributing the resin, but may also produce composite structures that have a rougher finish.

Vacuum-assisted resin transfer molding (VARTM) refers to a variety of related processes using vacuum pressure to aid in the infusion of resin. The difference between VARTM and a standard RTM process is that the resin in a VARTM process is drawn through use of a vacuum rather than pumped in under pressure. For example, a vacuum bag may be placed over the portions of the composite laminate and resin may be drawn into the composite layers through that vacuum instead of attempting to use pressure to push the resin through the laminate. This may eliminate the need to expose the composite laminate to high heat or high pressure, thereby allowing the use of lower cost tooling and to inexpensively produce large, complex structures as part of a single process. For example, the entirety of a large structure may not fit within the temperature-controlled oven or autoclave. The VARTM process may be limited, however, to applying a vacuum may to a one-sided mold. As a result, the geometry of the composite structure may be limited to shapes possible with a single-sided mold.

Lastly, resin film infusion (RFI) is a hybrid process in which dry laminate is placed in a mold on top of a layer or interleaved with layers of high viscosity resin film. For example, resin film may be laid up with the dry laminate instead of infusing the resin from outside the mold or tooling during the formation process. Under applied heat, vacuum, and/or pressure, the resin is drawn from the films into the layers of laminate resulting in uniform resin distribution. Since the resin needs only flow a short distance into the laminate, resin films comprising high viscosity toughened resins can be used.

Each of the above-described processes may be used with the systems and methods according to the teachings of the disclosure.

Figure 3A:
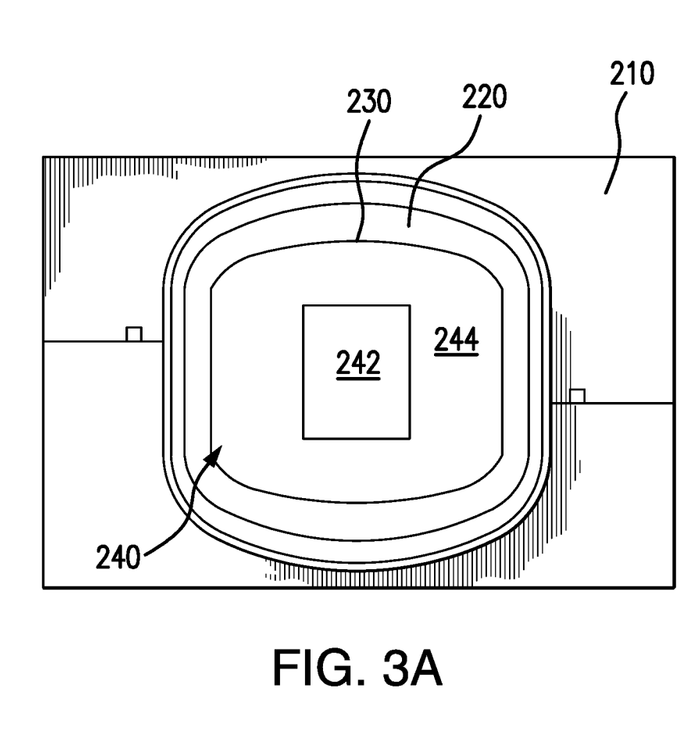
FIGS. 3A and 3B illustrate end-on views of example composite manufacturing system of FIGS. 2A and 2B at two different stages of forming a composite component, according to certain embodiments.
Figure 3B:
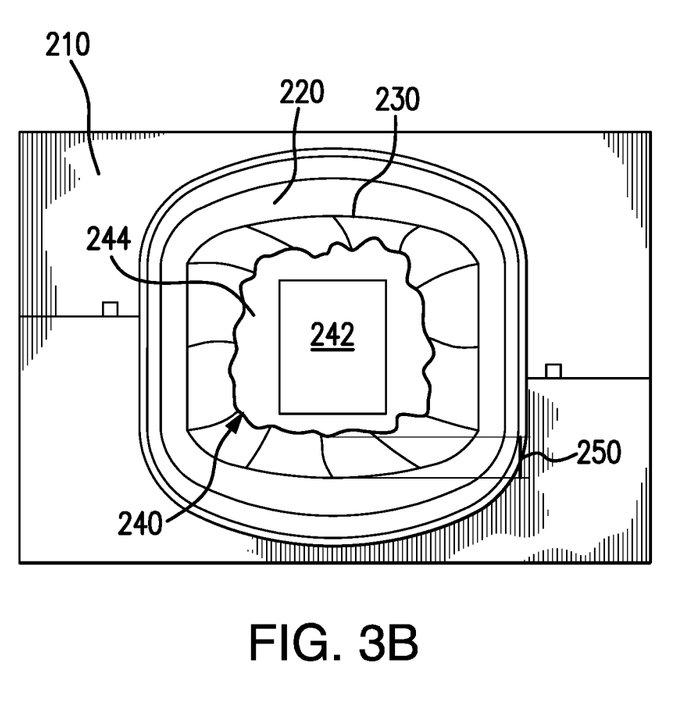

FIG. 3A and 3B illustrate end-on views of example composite manufacturing system 200 of FIGS. 2A and 2B at two different stages of forming a composite component, according to certain embodiments. FIG. 3A illustrates mandrel 240 and composite laminate 220 prior to the deformation of the portion of mandrel 240. For example, FIG. 3A may illustrate composite manufacturing system 200 after the infusion of resin inside composite laminate 220 and after the gelation of the resin. An increased temperature and/or pressure may have been applied to cause the gelation of the resin. At this stage, composite laminate may be sufficiently rigid that it no longer requires the supporting surface of mandrel 240. Mandrel 240 may maintain its shape during this stage with deformable portion 244 maintaining its original shape even though it had been exposed to elevated temperature and/or pressure.

In contrast, FIG. 3B illustrates the end on view after a further or different environmental condition is applied to composite laminate 220 and mandrel 240. For example, a different temperature and/or pressure may be applied to composite manufacturing system 200, which causes at least a portion of mandrel 240 to deform. This may occur after the composite structure formed from composite laminate 220 and the disposed resin is structurally sound and no longer needs the support from mandrel 240. Exposed to this second environmental condition, deformable portion 244 of mandrel 240 may deform as shown in FIG. 3B. This may occur near the exposed surface of mandrel 240 near the surface of the newly formed composite structure. In this manner, certain portions of mandrel 240 may be changed in shape and/or reduced in size. As a result, mandrel 240 may be removable even when the composite structure has a complex curved surface and when mandrel 240 would not have been removable in the earlier stage depicted in FIG. 3A. For example, the curved portion at the tip of mandrel 240 may be resting against a surface of the composite structure that prevents mandrel 240 from being removed. In this manner, the controlled deformation of mandrel 240 may aid in its extraction while it still provides sufficient support for forming a surface of the composite structure.

Figure 4:
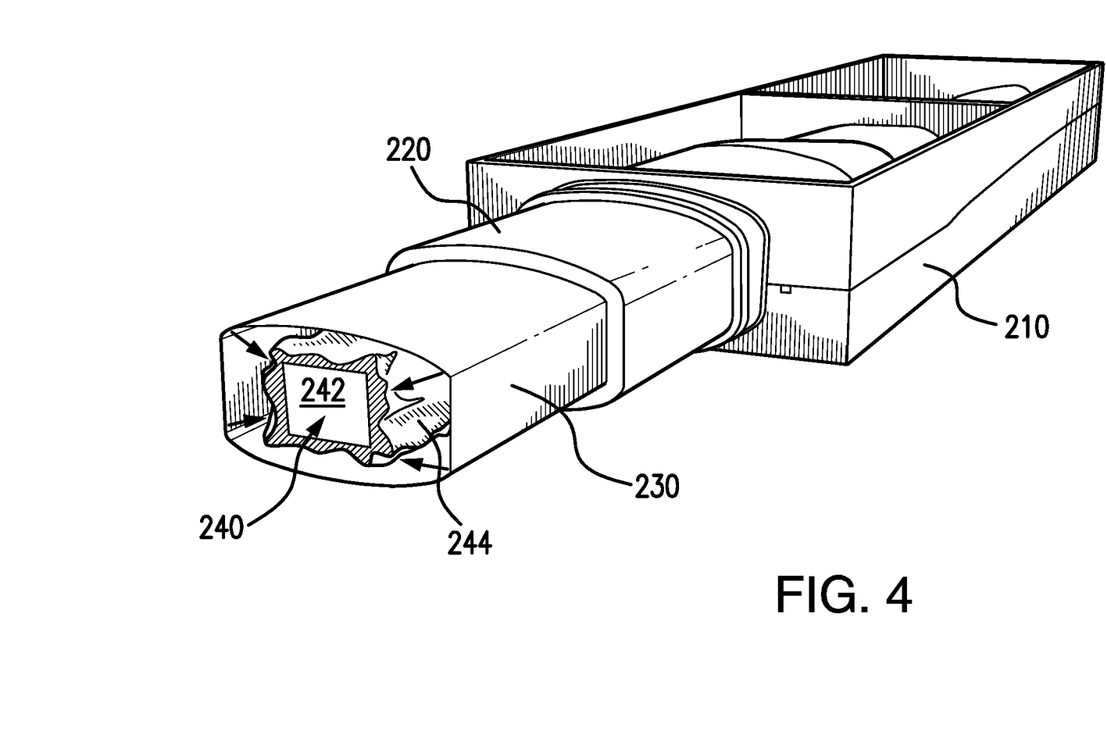
FIG. 4 illustrates an exploded view of example composite manufacturing system of FIGS. 2A to 3B prior to extraction of a deformed mandrel, according to certain embodiments.

FIG. 4 illustrates an exploded view of composite manufacturing system 200 after the further or second environmental condition is applied. As discussed herein, after a second environmental condition is applied, mandrel 240 may become deformed. Deformable portion 244 may be deformed such that it no longer occupies the entire inside mold line of composite laminate 220. In certain embodiments, composite laminate 220 and the infused resin may be cured without extracting mandrel 240. After curing, vacuum bag 230 and mandrel 240 may be extracted. In some embodiments, vacuum bag 230 may enclose mandrel 240 such that any deformed, melted, or liquefied portions of mandrel 240 that may have detached from mandrel 240 may be caught inside vacuum bag 230 and extracted with it. The entirety of vacuum bag 230 and mandrel 240 may be removed from composite structure that has formed out of composite laminate 220. In certain embodiments, composite manufacturing system 200 does not include vacuum bag 230. Even still, deformed mandrel 240 may be extracted due to its decreased size and/or changed shape.

Figure 5:
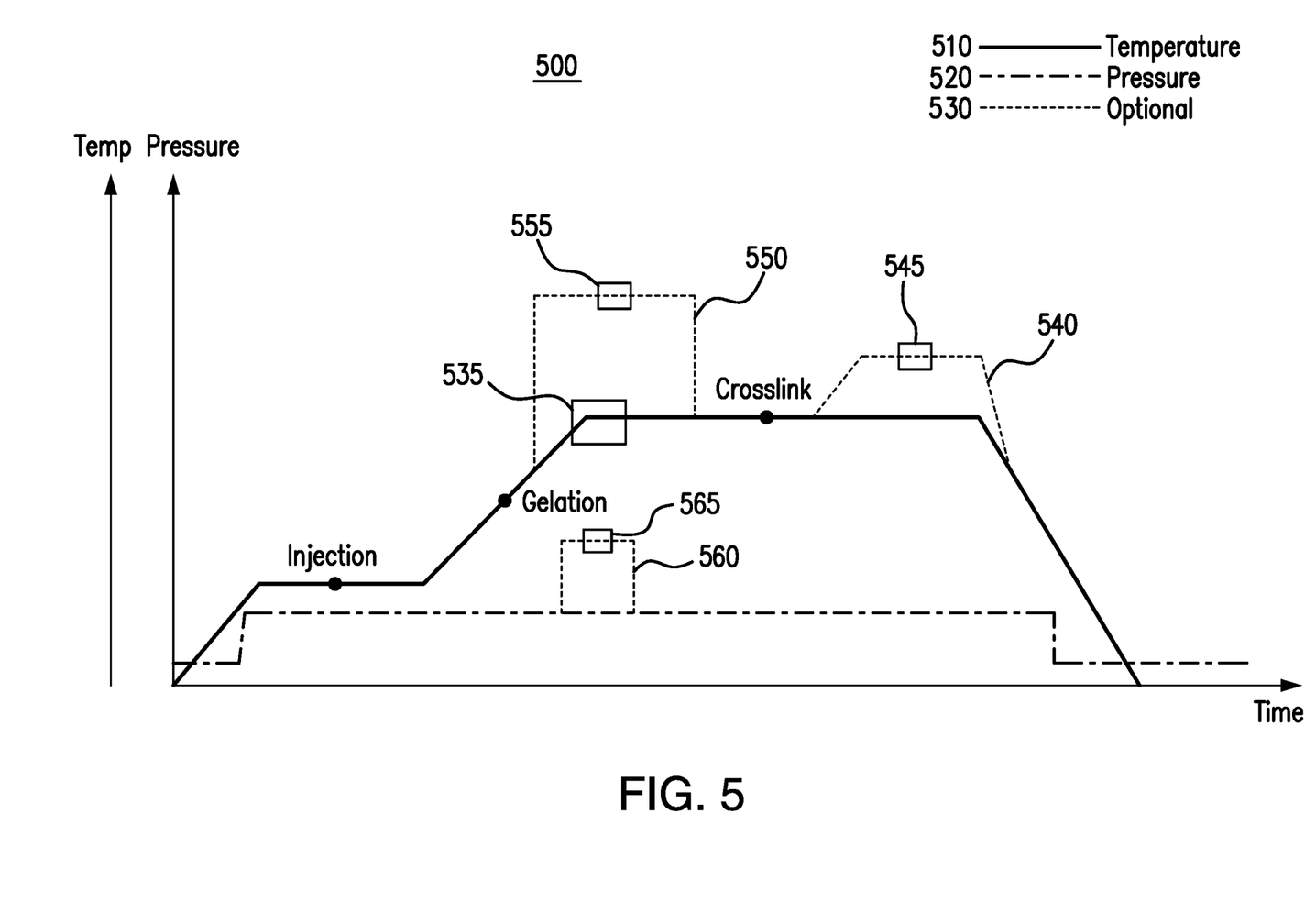
FIG. 5 illustrates example plots of temperature and pressure during the use of example composite manufacturing system of FIGS. 2A to 4 with various deformable mandrels, according to certain embodiments.

FIG. 5 illustrates example plots 500 of temperature 510 and pressure 520 during the use of example composite manufacturing system 200 with mandrel 240. Plots 500 illustrates an example plot of temperature 510 and pressure 520 over time during the curing process of the composite component. For example, plots 500 may illustrate the environmental conditions of composite manufacturing system 200 after composite laminate 220 is disposed over mandrel 240. The plot of temperature 510 is illustrated with a solid line and the plot of pressure 520 is illustrated with a dash-dot line. At the beginning of the curing process, the temperature and pressure may be increased. Resin may then be injected into composite laminate 220 at the point indicated on plot 500.

After the infusion of the resin, the temperature may be further increased. At the indicated point, gelation of the resin occurs. Up to this point, mandrel 240 has maintained its shape and size. After gelation, however, mandrel 240 may no longer need support the forming composite structure. At this point, a second environmental condition may be applied. For example, the temperature may continue to rise beyond the gelation temperature. After reaching temperature 535, a portion of mandrel 240 may begin to deform. For example, deformable portion 244 may begin to deform when exposed to temperature 535. In this manner, mandrel 240 is deformed by applying a temperature between the gelation temperature and the cure temperature. The elevated temperatures may be maintained to further harden the resin, such as by facilitating the cross-linking of polymers. After a predetermined time, the temperature and pressure may be decreased indicating the end of the curing of the composite structure.

In certain embodiments, the second environmental condition causing mandrel 240 to deform is different from temperature 535 between the gelation temperature and the curing temperature. For example, plot 500 also illustrates optional curves 530 of the applied pressure and/or temperature. These optional applied environmental conditions may cause a portion of mandrel 240 to deform. In certain embodiments, temperatures above the curing temperature may be applied to cause the deformation of mandrel 240. For example, optional curve 550 shows the temperature increasing above the curing temperature temporarily. At temperature 555, mandrel 240 may be configured to partially deform. As another example, optional curve 540 shows an increased temperature after the cross-linking of the resin. The increased temperature 545 may cause mandrel 240 to deform. Thus, an increased temperature used to cause the deformation of mandrel 240 may be applied during any point of the curing process after the gelation of the resin.

In certain embodiments, a pressure above the curing pressure may be applied to cause the deformation of mandrel 240. For example, optional curve 560 shows the pressure increasing above the curing temperature temporarily. At pressure 565, mandrel 240 may be configured to partially deform. Similarly, an increased or changed pressure may be applied at any time after the gelation of the resin to cause mandrel 240 to deform. Although the applied temperatures and pressures have been discussed separately, they may be used in tandem or in addition to other controllable environmental conditions to cause the deformation of mandrel 240. For example, a combination of an applied temperature and pressure over a time period may be used to deform mandrel 240. In some embodiments, mandrel 240 may be deformed in stages, wherein mandrel 240 may be deformed partially at one point of the process and further deformed at a later point.

The examples discussed above are only a myriad of different environmental conditions that may be applied during the curing process to cause the deformation of mandrel 240. The methods and systems discussed herein may be applicable to any number of combinations of mandrel 240 and the applied curing conditions. For example, the material composition of mandrel 240 may be designed to deform in environmental conditions already applied in existing cure cycles for particular composite components.

Figure 6:
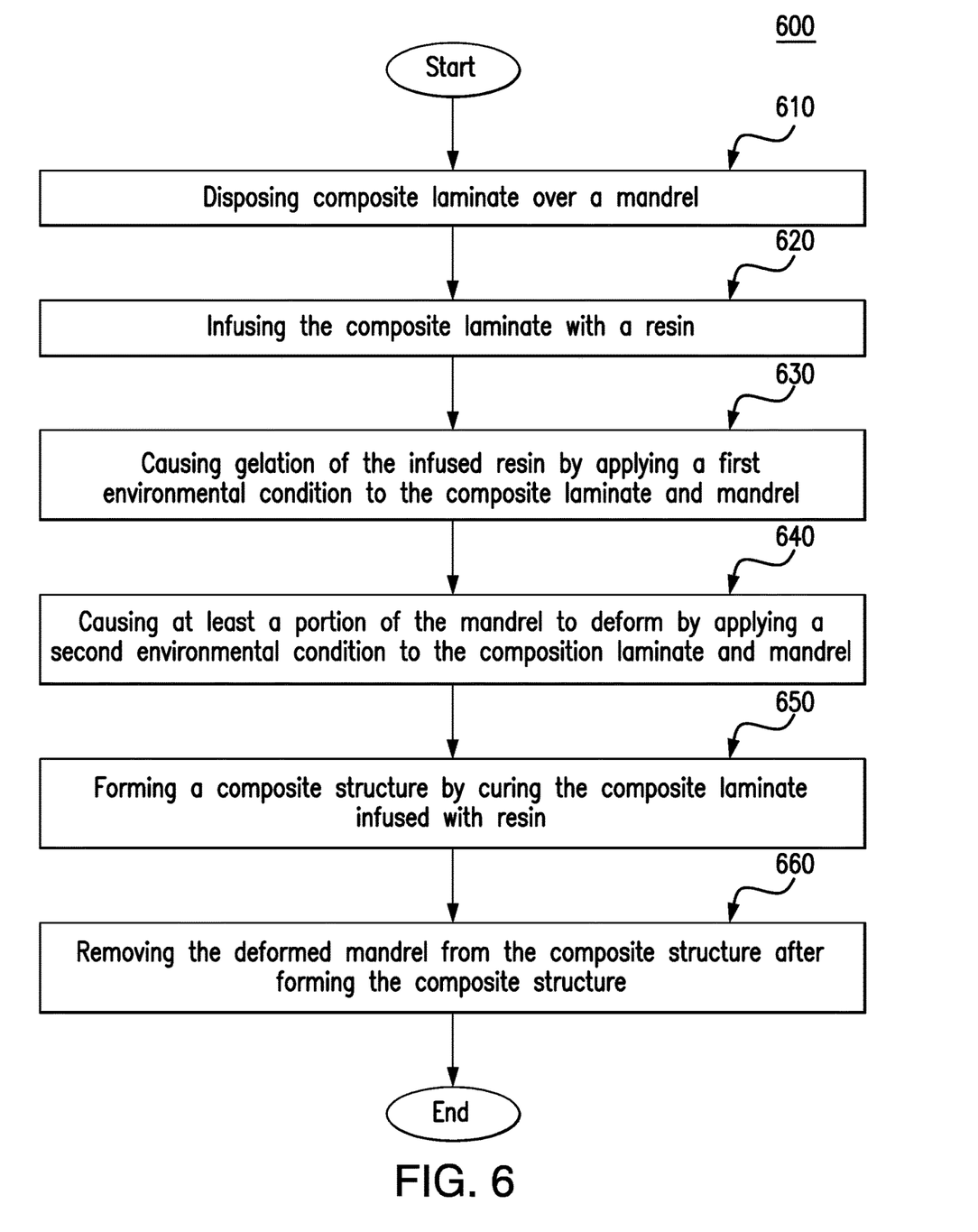
FIG. 6 is a flowchart illustrating a method of forming a composite structure using a composite manufacturing system, according to certain embodiments.

FIG. 6 is a flowchart illustrating a method 600 of forming a composite structure, according to certain embodiments. Method 600 may start at step 610. At step 610, composite laminate may be disposed over a mandrel. For example, one or more layers of composite laminate 220 may disposed over mandrel 240. In certain embodiments, a vacuum bag or bladder may be disposed over a mandrel between the mandrel and any laid up composite laminate. For example, vacuum bag 230 may be disposed over mandrel 240 prior to laying up composite laminate 220 and/or distribution media over mandrel 240.

At step 620, the composite laminate is infused with a resin. As discussed above, resin may include any resin, adhesive, or epoxy that may be cured in order to form a composite structure incorporating the composite laminate. Step 620 may occur before or after the composite laminate is disposed over the mandrel in step 610. For example, the composite laminate may be pre-pregnated such that resin is already present within the composite laminate before it is disposed over the mandrel. As another example, the composite laminate may be infused with resin after disposed over the mandrel, according to any of the various infusion processes discussed herein. To form the desired shape of the composite structure, the laid up composite laminate and mandrel may be further disposed within a tooling, such as cure tooling 210 prior to processing the composite laminate.

At step 630, gelation of the infused resin is caused by applying a first environmental condition to the composite laminate and mandrel. For example, an applied temperature and/or pressure may be applied to the resin within the composite laminate. This may cause the gelation of the infused resin. At this point, the resin has hardened, e.g., become more viscous, such that it is no longer a liquid and has lost its ability to flow. As a result, the composite laminate infused with resin may have a rigid shape after gelation of the resin.

At step 640, at least a portion of the mandrel is deformed by applying a second environmental condition to the composite laminate and mandrel. For example, a different temperature and/or pressure condition may be applied to the entire composite manufacturing system to cause a portion of the mandrel to deform. In certain embodiments, mandrel 240 includes deformable portion 244, at least a portion of which may deform when exposed to the second environmental condition. The deformation may change the shape and/or size of the mandrel.

At step 650, a composite structure is formed by curing the composite laminate infused with resin. For example, the resin may continue to harden after gelation and as a result, fully integrate with the composite laminate to form a solid composite structure. Curing may be caused by increasing the temperature and/or pressure exposed to the composite laminate and resin beyond the gelation point.

After forming the composite structure, at step 660 the deformed mandrel may be removed from the composite structure. For example, the mandrel may remain within the composite laminate during the curing process even after the mandrel is deformed. After the curing step, because the mandrel is deformed it may be removed easily. For example, even if the composite structure has complex shape that would normally not allow the mandrel prior to its deformation to be removed, the deformed mandrel may be removed. Method 600 may end after step 660.

Modifications, additions, or omissions may be made to method 600 depicted in FIG. 6. Method 600 may include more, fewer, or other steps. For example, method 600 may further include the step of covering the mandrel with a vacuum bag. The vacuum bag may surround the mandrel prior to laying up the composite laminate over the mandrel. As another example, method 600 may further include the step of disposing cure tooling over at least a portion of the composite laminate and mandrel prior to applying the first environmental conditional. The tooling may provide an outside mold line to form the shape of another surface of the composite structure.

Additionally, steps may be performed in parallel or in any suitable order. While discussed as various components of composite manufacturing system 200 performing the steps, any suitable component or combination of components of composite manufacturing system 200 may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
   providing an integrated mandrel comprising a deformable portion, a non-deformable portion, and a surface having a shape matching a shape of a surface of a composite structure;
   covering the integrated mandrel with a vacuum bag or bladder;
   disposing composite laminate on the integrated mandrel;
   surrounding the integrated mandrel and the composite laminate with cure tooling;
   infusing resin into the composite laminate;
   causing gelation of the resin infused in the composite laminate by applying a first temperature and environmental pressure to the composite laminate and the integrated mandrel, wherein neither the deformable portion or non-deformable portion of the integrated mandrel deform when the first temperature and environmental pressure are applied;
   causing the deformable portion of the integrated mandrel to deform by applying a second temperature and environmental pressure to the composite laminate and the integrated mandrel, wherein the non-deformable portion of the integrated mandrel does not deform when the second temperature and pressure are applied, wherein at least one of the second temperature and pressure is different from at least one of the first temperature and pressure, wherein the deformable portion of the integrated mandrel comprises one or more deposits of an element which catalyzes with a surrounding material of the integrated mandrel when exposed to the surrounding material of the integrated mandrel, and wherein the deformation is caused at least in part by catalyzation of the one or more deposits with the surrounding material of the integrated mandrel;
   curing the composite laminate to form the composite structure; and
   removing the integrated mandrel from the composite structure, wherein the integrated mandrel is not removable unless the deformable portion of the integrated mandrel is deformed.

2. A method of forming composite components, the method comprising:
   disposing composite laminate over an integrated mandrel, wherein the mandrel comprises a deformable portion and a non-deformable portion;
   infusing the composite laminate with a resin;
   causing gelation of the infused resin by applying a first environmental condition to the composite laminate and the integrated mandrel, wherein neither the deformable portion or non-deformable portion of the integrated mandrel deforms when the first environmental condition is applied;

causing at least a portion of the integrated mandrel to deform by applying a second environmental condition to the composite laminate and the integrated mandrel, wherein the non-deformable portion of the integrated mandrel does not deform when the second environmental condition is applied, wherein the deformable portion of the integrated mandrel comprises one or more deposits of an element which catalyzes with a surrounding material of the integrated mandrel when exposed to the surrounding material of the integrated mandrel, and wherein the deformation is caused at least in part by catalyzation of the one or more deposits with the surrounding material of the integrated mandrel;

forming a composite structure by curing the composite laminate infused with resin; and removing the deformed integrated mandrel from the composite structure after forming the composite structure.

3. The method of claim 2, wherein the integrated mandrel is not removable from the composite structure before the portion of the mandrel is deformed.

4. The method of claim 2, further comprising covering the integrated mandrel with a vacuum bag prior to disposing the composite laminate over the mandrel.

5. The method of claim 2, further comprising disposing cure tooling over at least a portion of the composite laminate and the integrated mandrel prior to applying the first environmental condition.

6. The method of claim 2, wherein the second environmental condition is a temperature between a gelation temperature of the resin and a curing temperature of the composite structure.

7. The method of claim 2, wherein the second environmental condition is an increased pressure above a pressure applied during gelation of the infused resin.

8. The method of claim 2, wherein infusing the composite laminate with a resin is part of a Resin Transfer Molding (RTM) process, a Resin Infusion (RI) process, a resin film infusion (RFI), or a Vacuum Assisted Resin Transfer Molding (VARTM) process.

9. The method of claim 2, wherein the composite structure comprises a tubular shape with a center axis.

10. The method of claim 2, wherein disposing the composite laminate over the integrated mandrel comprises applying a tackifier to the integrated mandrel and/or the composite laminate.

11. The method of claim 2, wherein disposing the composite laminate over the integrated mandrel does not comprise applying a tackifier to the integrated mandrel and/or the composite laminate.

12. The method of claim 2, wherein applying a second environmental condition to the composite laminate and the integrated mandrel initiates a catalyzation event that causes the deformation of the portion of the integrated mandrel.

* * * * *